Sept. 6, 1932.  E. A. THOMPSON  1,876,098
POWER TRANSMISSION MECHANISM
Original Filed April 15, 1925  4 Sheets-Sheet 1

Fig.1.

Inventor:
Earl A. Thompson
By Milans Milans
Attorneys

Witness:
Jas E. Hutchinson

Sept. 6, 1932.   E. A. THOMPSON   1,876,098
POWER TRANSMISSION MECHANISM
Original Filed April 15, 1925   4 Sheets-Sheet 4

Inventor:
Earl A. Thompson,
Milano & Milano
Attorneys

Witness:
Jas. E. Hutchinson

Patented Sept. 6, 1932

1,876,098

UNITED STATES PATENT OFFICE

EARL A. THOMPSON, OF BIRMINGHAM, MICHIGAN, ASSIGNOR TO GENERAL MOTORS CORPORATION, OF DETROIT, MICHIGAN, A CORPORATION OF DELAWARE

POWER TRANSMISSION MECHANISM

Application filed April 15, 1925, Serial No. 23,222. Renewed June 18, 1932.

This invention relates to improvements in variable speed power transmission gearing consisting of a plurality of trains between the power input and power output shaft, any one of which may be coupled or uncoupled by engagement or disengagement of toothed power transmitting elements.

An object of the invention is to enable intermeshable toothed power transmitting elements of any selected train of a variable speed gearing combination to be intermeshed, while the gears are in motion, comparatively noiselessly and without danger of breaking the teeth, by first bringing the toothed elements to substantially equal speeds before attempting to mesh them; and in rendering ineffective any attempt to move the toothed elements into engagement until they have attained substantially equal speeds.

The invention includes the combination, with engageable and disengageable toothed power transmitting elements, of frictional synchronizing coupling elements and improved means for effecting a torque transmitting frictional engagement between said frictional coupling elements in order to bring the toothed power transmitting elements to substantially equal speeds before an attempt is made to effect engagement of the toothed elements. It further includes yieldable automatic locking means arranged to prevent intermeshing of the toothed elements until a predetermined amount of pressure, sufficient to effect synchronous rotation of the toothed coupling elements, has been applied to the frictional coupling elements, this pressure being effective to bring about release of the yieldable locking means and allow the toothed coupling elements to intermesh. It further includes a manual shift lever, relatively movable operating slides one of which is engaged by the shift lever and acts upon the friction couplings and the other of which acts upon a slidable toothed power transmitting element, and is connected to the friction coupling operating slide by certain lost motion connecting means as hereinafter described, whereby movement of the shift lever first causes engagement of the friction coupling elements and thereafter, when the relative movement in one direction of the slides has been taken up, engagement of the toothed coupling elements at a relatively high rate of speed with the interposition of a resistance greater than the normal resistance to movement of the movable toothed power transmitting element.

While I have illustrated in the accompanying drawings the preferred embodiments of the invention as they now appear to me it will be understood that such changes may be made as will fall within the scope of the appended claims.

In the drawings 1 indicates the transmission housing or casing of usual construction, having mounted therein, in the usual manner, the drive shaft 2, the driven shaft 3, and the countershaft 4, the driven shaft 3 having slidably mounted thereon the conventional form of power gears shown at 5 and 6 and the countershaft 4 having mounted thereon the conventional power gear cluster including the gears 7, 8, 9 and 10, the gear 7 being at all times in mesh with the gear 11 on the inner end of the drive shaft 2 as is usual.

For regulating the speed of the power gears on the driven shaft or counter shaft I provide the mechanism indicated generally at A, and while the form of speed regulating mechanism illustrated consists of frictional coupling devices adapted to synchonize the speeds of the gears similar to those disclosed in my copending application filed Oct. 9, 1923, Ser. No. 667,478 I wish it understood that various other forms of speed regulating mechanism might be equally as well used such as is disclosed in my copending application filed January 3, 1924, Ser. No. 684,173 or as disclosed in my copending application filed April 15, 1925, Serial No. 23,221.

In order that the operator may control the selection of the desired train of gears and synchronize the gears or other toothed coupling elements before intermeshing them the following mechanism is provided:

Slidably mounted in the transmission housing, preferably adjacent the top thereof, are the shifter rods 12 and 13, the rod 12 having the shifter fork indicated generally at 14 secured thereto and the rod 13 having secured thereto the shifter fork 15. The lower end of the shifter fork 14 engages in the groove 16 of the gear 5 whereas the lower end of the fork 15 engages in the groove 17 of the gear 6, the gear 5 being shifted upon operation of the shifter rod 12 and the gear 6 being shifted upon operation of the shifter rod 13 through means of the hand control shift lever 18. The shifter rod 12 is provided with the elongated recesses 19 and 20 and the concaved recesses 21 and 22 whereas the rod 13 is provided with the elongated recesses 23 and 24 and the concaved recesses 25 and 26. Formed transversely of the forward end of the transmission housing is an opening 27 at opposite ends of which are received the balls 28 and 29 normally held in their extended positions by means of the coiled spring 30 positioned in the opening 27 between the balls. The ball 28 is normally received in the elongated recess 19 of the rod 12 whereas the ball 29 is normally received in the elongated recess 24 of the rod 13. An opening 31 extends from one side of the housing, in alignment with the opening 27, and receives a ball 32 which is held in its extended position by means of the coiled spring 32' which is positioned within the opening by means of the cap or plug 33. The ball 32 is normally received in the elongated recess 23 of the rod 13. An opening 34 is formed in the opposite side of the housing, in alignment with the opening 27, and in this opening is positioned a ball 35 which is held in its extended postion by means of the coiled spring 36 positioned within the opening by means of the cap or plug 37. The ball 35 is normally received in the elongated recess 20. With the balls in the position shown in Fig. 2 of the drawings the rods 12 and 13 are held in their neutral positions by yieldable engagement of the balls therewith. It is thought that the advantages in providing the elongated recesses in the shifter rods will be readily appreciated. The object of providing these elongated recesses is to make certain that when the shifter rod is being shifted out of either gear position it will always be stopped in neutral position since the ball that is next to operate is always down in its recess. The lengths of the recesses are equal to the length of the shift as will be apparent. As an example reference is made more particularly to Fig. 2 of the drawings wherein the shifter rods are shown in neutral position with the balls engaging ends of their respective recesses. If the shifter rod 12 should be moved to the right of the position shown in Fig. 2 the ball 28 would be raised out of the recess 19 against the action of the coiled spring 30 but the ball 35 would remain within its recess. When the shifter rod 12 is next moved in the reverse direction, when neutral is reached, the ball 35, remaining in the recess 20, will engage the shoulder at the right hand end of the recess and retard the movement of the shifter rod at neutral. Further movement of the rod towards the left would cause the ball 35 to rise from its recess while the ball 28 remains in its recess 19. From this it will be seen that one of the balls always being down it is impossible to run the rod by the neutral position without causing it to pause for the synchronizing operation.

Figure 3:
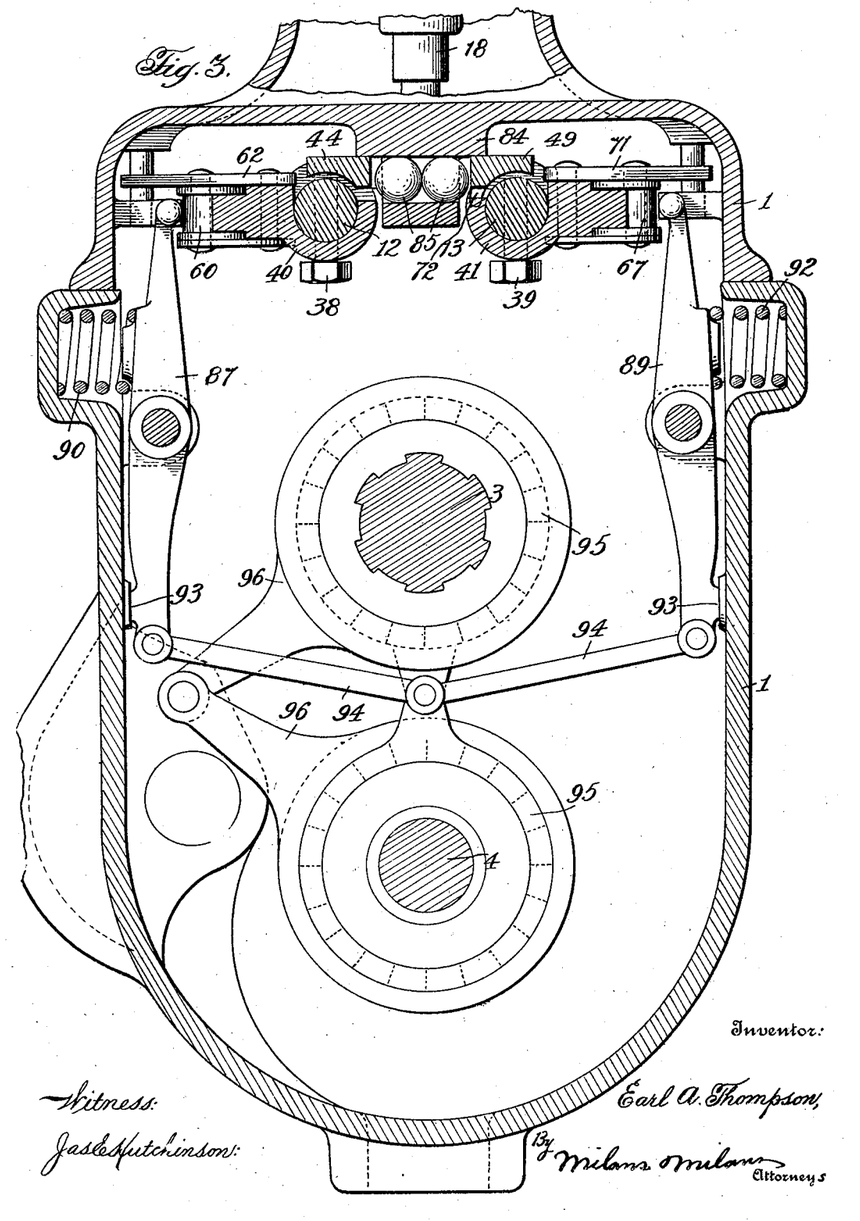
Fig. 3 is a transverse vertical section through the transmission housing with parts shown in elevation.

Secured to the rods 12 and 13 respectively, by means of the screws 38 and 39 or other suitable fastenings are the link supporting brackets 40 and 41 of the shape more particularly illustrated in Fig. 3 of the drawings. Formed on the outer edges of the brackets 40 and 41 are the projections 42 and 43 respectively for a purpose which will be presently stated. Slidably mounted upon the shifter rod 12 is a member adapted to operate the frictional coupling devices comprising a yoke 44 having the arms or projections 45 and 46 formed at opposite ends thereof and formed on these arms or projections 45 and 46 are the inwardly extending projections 47 and 48 respectively. Slidably mounted upon the shifter rod 13 is another member for operating other frictional coupling devices comprising a yoke 49 having at opposite ends the arms or projections 50 and 51 the projections being provided at their ends with the inwardly extending projections 52 and 53 respectively. Pivotally connected to the projection 45 of the yoke 44 is a link 54 and pivotally connected to the link bracket 40, adjacent one end, is the link 55, the links 54 and 55 being connected by the link 56. Pivotally connected to the lug or projection 46 of the yoke 44 is the link 57 and pivotally connected adjacent one end of the link bracket 40 is a link 58, the links 57 and 58 being connected by the link 59. At the point where the link 54 is connected to the link 56 is a roller 60 and a similar roller 61 is provided at the point where the link 57 is connected to the link 59. The link 55 has the extending arm 62 and the link 58 has a similar arm 63 for a purpose which will be later brought out. Pivotally connected to the lug or projection 50 of the yoke 49 is the link 64 and pivotally connected adjacent one end of the link supporting bracket 41 is a link 65, the links 64 and 65 being connected by the link 66 having a roller 67 at the point where the link 64 is connected to the link 66. Pivotally connected to the lug or projection 51 at the opposite end of the yoke 49 is the link 68 and pivotally connected adjacent the opposite end of the link supporting bracket 41 is the link 69 the links 68 and 69 being connected by the link 70. Formed on the outer end of the link 69 is an extending arm 71 for the same purpose as will be brought out for the similar arms 62 and 63. Formed on that end of the yoke 49 having the lug or projection 51 is an inwardly extending projection 72 which is adapted to engage the adjacent end of the link supporting bracket 41 for shifting the said link supporting bracket and its connected shifter rod when coming from low gear to neutral or when going from neutral into reverse.

Figure 2:
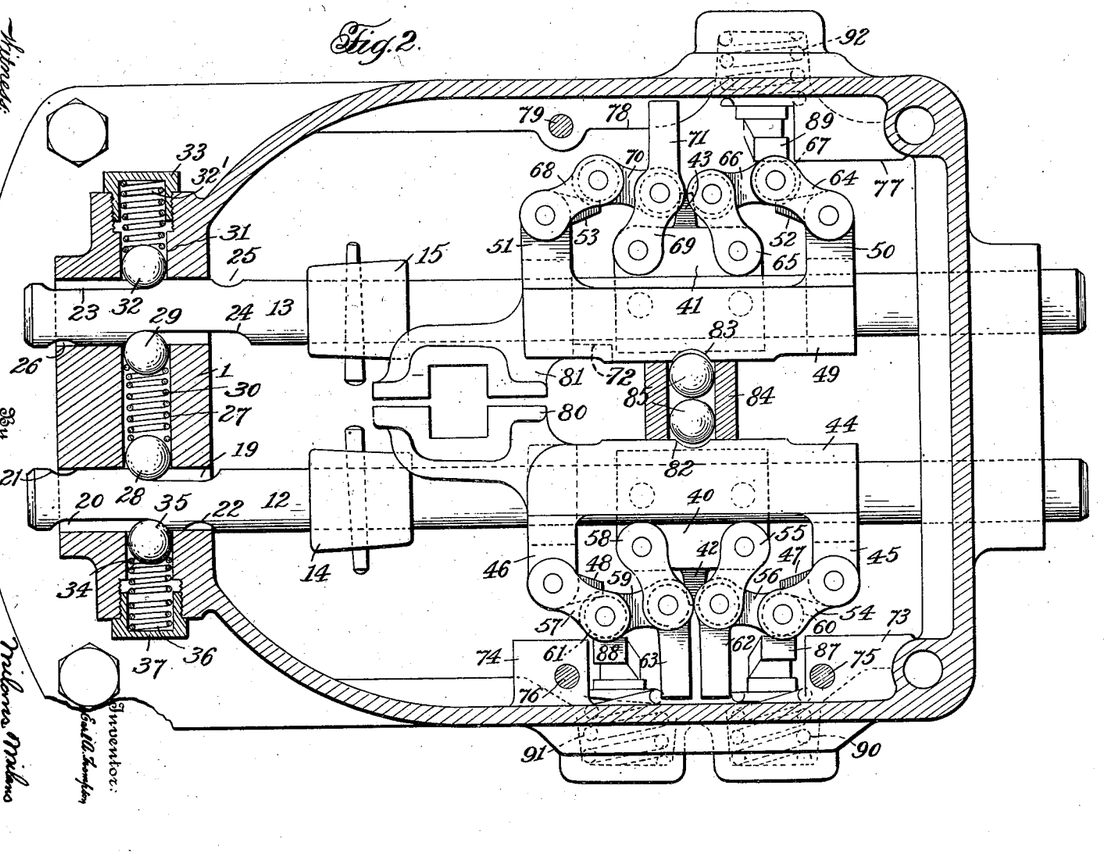
Fig. 2 is a horizontal section through the transmission housing with parts shown in top plan.

Extending inwardly from that side of the transmission housing or casing adjacent the shifter rod 12 are the ledges 73 and 74, the inner edges of which are on the same plane as the faces of the rollers 60 and 61. Extending between the top of the housing or casing and the ledges 73 and 74 are the vertically extending pins 75 and 76. These pins are adapted to be engaged respectively by the arms 62 and 63 as the yoke 44 is moved in opposite directions. Formed on the opposite side of the housing is the ledge 77 the outer edge of which will be on a plane with the roller 67 and parallel with the shift rod 13. Secured between the top of the casing or housing and the boss 78 is a vertically extending pin 79 adapted to be engaged by the arm 71 when the yoke 49 is shifted to the left as shown in Fig. 2 of the drawings.

Formed on the yokes 44 and 49 respectively are the notched extensions 80 and 81, the lower end of the gear shift lever 18 being adapted for reception in the notches thereof for operation of the yokes and their associated shifter rods for shifting the gears in the well known manner. Formed in the inner edges of the yokes 44 and 49 respectively are the concaved recesses 82 and 83 and supported in a boss 84 extending down from the upper side of the transmission housing or casing are the balls 85 and 85 which form an interlock between the yokes to prevent simultaneous operation thereof, the transverse width of the two balls being equal to the width of the boss 84 and the depth of one of the concaved recesses 82 and 83. By this construction it will be seen that both the yokes 44 and 49 could not be shifted simultaneously.

Pivotally connected to that side of the transmission housing or casing adjacent the rod 12 are the rocker arms 87 and 88 and pivotally connected to the opposite side of the housing or casing, adjacent the rod 13, is the rocker arm 89. The upper end of the rocker arm 87 is adapted to be engaged by the roller 60 and the upper end of the arm 88 will be engaged by the roller 61. The upper end of the rocker arm 89 will be engaged by the roller 67. A coiled spring 90 is supported in a recess formed in the side of the transmission housing or casing and the inner end engages the rocker arm 87 above the pivot point. A similar spring 91, similarly mounted, engages the rocker arm 88 above the pivot point and a spring 92, similarly mounted engages the rocker 89 above the pivot point. Each of the rocker arms is provided with a lug or projection 93 which will engage the housing or casing to limit the movement thereof. The lower ends of the rocker arms are connected through means of the links 94 to the movable crowder members for operating the speed control mechanism shown generally at A, the movable crowder members being shown generally at 95 and the stationary crowder members at 96.

The link mechanism described, connected to each synchronizer operating yoke and to the corresponding shifter rod constitutes a lost motion connection or means for limiting the extent of relative movement of yoke and shifter rod; said link mechanism also constitutes a means whereby the force exerted by the shift lever in a direction longitudinal of the shifter rod is resolved into two forces at right angles to each other, one component acting to rock the arm which causes operation of the friction synchronizing devices, and the other tending to move the shifter rod longitudinally the latter being resisted by the yieldable locking devices consisting of the spring pressed balls which yieldably latch the rod to the casing. As long as the friction devices are not in firm engagement the longitudinal component is inadequate to release the means that lock the rod to the casing; but when the friction devices can be squeezed no more tightly together the links become in effect a single solid member rigid with both yoke and rod so that continued pressure of the shift lever overcomes the resistance of the latch mechanism, moves both yoke and rod, releases the friction elements and causes intermeshing of the toothed elements.

Figure 1:
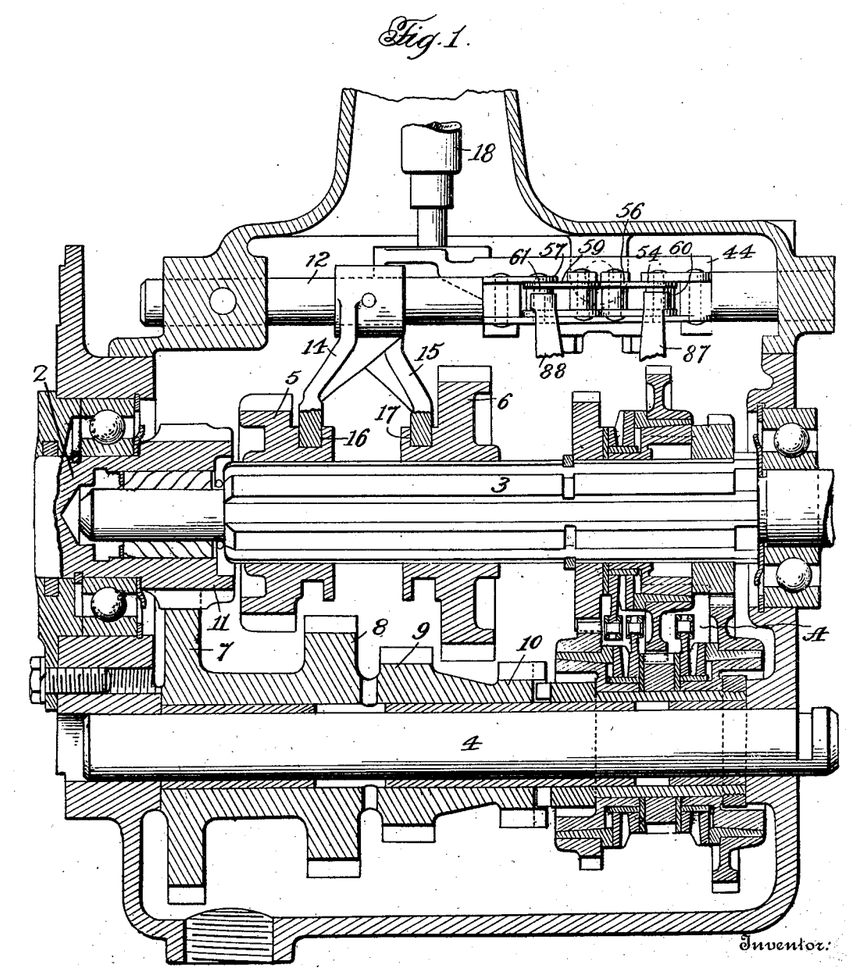
Fig. 1 is a longitudinal vertical section through the transmission housing with parts shown in side elevation.
Figure 4:
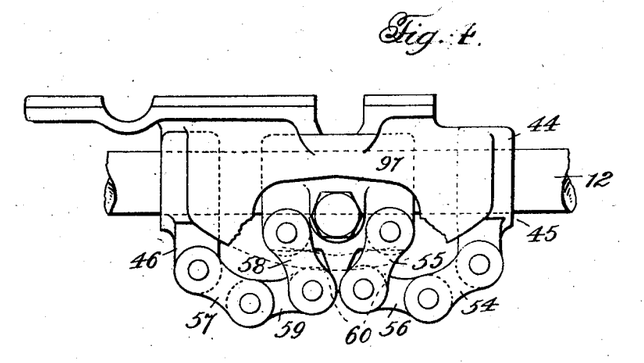
Figs. 4 and 5 show a different form of connection between the shiftable links and shifter rods and different means for connecting the rocker arm to the movable crowder member.
Figure 5:
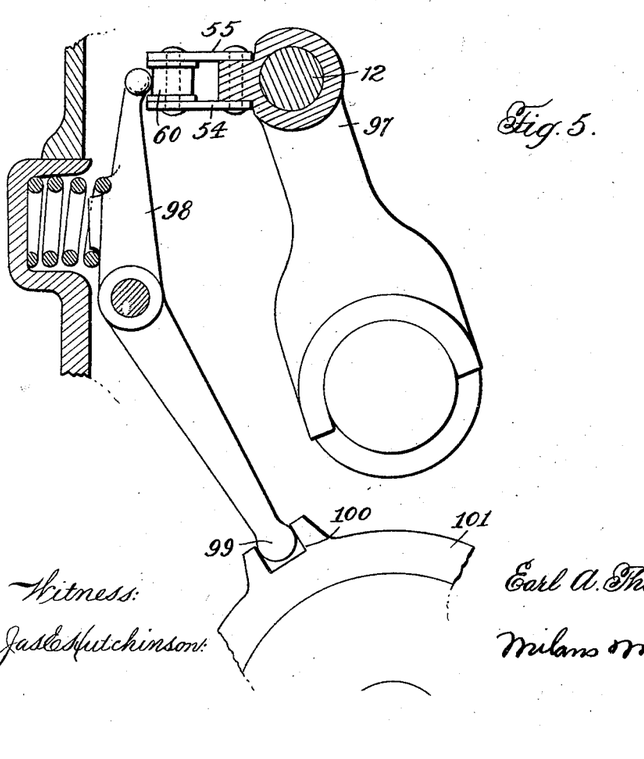

In Figs. 4 and 5 of the drawings I have shown a different means for forming the connection between the shifter rod and the slidable yoke and the means for connecting the rocker arms to the movable crowder members. In the form of the invention shown in Figs. 4 and 5 the shifter fork 97 is secured to the shifter rod 12 at a point normally intermediate the ends of the slidable yoke 44 and the links 55 and 58 are connected directly to the shifter fork hub instead of to a separate and distinct link supporting bracket as disclosed in Figs. 1, 2, and 3 of the drawings. The rocker arm 98, shown in Fig. 5 is of a slightly different shape than the rocker arms shown in Fig. 3 of the drawings and is provided at the bottom with the rounded end 99 which is adapted to be received in the notched projection 100 of the movable crowder member 101. It is thought unnecessary to further describe or illustrate the specific construction of the crowder member as the same is disclosed in my copending application executed of even date herewith. The mechanism disclosed in Figs. 4 and 5 of the drawings will operate in the same manner as previously set forth in describing the operation of Figs. 1, 2 and 3 inclusive the only difference being that instead of having the links 55 and 58 connected directly to a separate link supporting bracket which is connected to the shifter rod and then having separate shifter forks connected to the shifter rod I connect the shifter fork to the shifter rod itself in position to have the links 55 and 58 connected thereto. In the form of device for operating the movable crowder member as shown in Fig. 5 I do away with the link connection 94 disclosed more particularly in Fig. 3 of the drawings.

In the drawings I have illustrated the parts of my transmission as in "neutral" position. Suppose it is desired to shift into "second" this is accomplished by operating the gear shift lever to engage the lower end thereof in the notched extension 80 on the yoke 44 and then when further operating the lever the yoke 44 will be slid upon the rod 12 without initially shifting the rod itself, the rod being held in its neutral position by means of the locking balls 28 and 35. In the form of transmission as illustrated to shift into "second" the yoke will be slid to the right as shown more particularly in Fig. 2 of the drawings. The inwardly extending projections 47 and 48 are designed to be engaged by the common pivotal point of the links 54 and 56 and 57 and 59 to prevent them from coming up to toggle or aligned position in which they might be inoperative. The extension 42 is provided on the bracket for the purpose of limiting the movement of the common pivotal points of the links 55 and 56 and 58 and 59 towards each other. When the yoke is initially moved the link 57 will force the roller 61 against the adjacent side of the top of the rocker arm 88 thereby pressing the same towards the housing or casing against the action of the coiled spring 91 and through means of the link connection 94 will operate the movable crowder member to control the speeds of the "second" speed power gears. This action continues until the resistance to the application of the friction members in the speed controlling device has become great enough to cause the locking ball 28 to release its engagement with the shoulder of the elongated recess 19 and permit the shifter rod 12 to be shifted by the link 57 due to its roller 61 rolling along the adjacent face of the top of the rocker 88. Simultaneously with the operation of the previously described links, the links 54 and 56 have drawn the link 55 with its extending arm 62 towards the stop pin 75. The extending arm 62 engages the pin 75 at approximately the same time as the roller 61 is ready to leave engagement with the rocker arm 88. At this point the continued shifting of the shift rod 12 is transferred from a pushing action by the link 57 resisted by the rocker arm 88 to a pulling action on the link 55 by means of the links 54 and 56 with the extended portion 62 against the stop pin 75. It will thus be seen that at this point the shift rod will be shifted at a higher rate of speed on account of the decreased leverage obtained through this connection and this decreased leverage is such that the shift rod will be accelerated and brought to its final shifted position with the same amount of movement of the control lever as though the shift rod had been moved directly by the control lever, from the initial point which has brought the "second" speed power gears into engagement, it being understood that the gear is shifted through means of the shifter fork 14 secured to the rod 12. As the roller 61 leaves the surface of the rocker arm the operation of the speed control mechanism is released. It will thus be seen that by varying the width of the top of the rocker arm with which the roller contacts that the point of release can be definitely fixed as desired. The above movement of engaging "second" speed has brought the roller 60 to the right as shown in Fig. 2 in engagement with the inner edge of the ledge 73 so that when it is desired to return the "second" speed gear to "neutral" it will be done by the movement of the control lever acting through the yoke and link 54, the roller 60 rolling along the face of the ledge 73 and thereby through means of the link connections 56 and 55 pushing against the projection 42 will slide the shift rod and associated parts to neutral position. It will therefore be seen that the control lever is moved through the same distance to operate the speed control mechanism and shift the power gear into mesh as is required to return it to neutral, and this distance is the same as it would be in the same transmission if the gears were shifted direct without a speed control device. It is also apparent that less force is required to shift the shiftable gear than to effect synchronization so that interposition of the described decreased leverage mechanism between the shift lever and the shiftable gear interposes a resistance to the movement of said gear which is additional to the normal resistance thereof thus avoiding the sudden drop of resistance to the movement of the shift lever that would otherwise occur and perhaps disconcert or impart disagreeable sensation to the operator.

It will be understood that the same action will take place when shifting from "neutral" into "high" or from "neutral" into "low." When shifting into "reverse" we do not provide for the control of the power gears and as has been previously described the shifter rod 13 is operated through engagement of the projection 72 on the yoke 49 engaging the end of the link supporting bracket 41. When in "reverse" the roller 67 engages the inner edge of the ledge 77 and when returning to "neutral" from "reverse" the action is the same as previously described when coming from "second" to "neutral."

Having fully described my invention what I claim as new and desire to secure by Letters Patent is:

1. A transmission mechanism including a shiftable power transmitting element and a shifter rod for operating the same, said shifter rod having elongated recesses formed therein, one of said recesses being spaced longitudinally of the rod relative to the other, and a member engageable in each of said recesses for normally holding the shifter rod in its neutral position but allowing movement of the rod in either direction with one of the members remaining in its recess.

2. A transmission mechanism including shiftable power transmitting elements and a shifter rod for operating the same, said shifter rod having two elongated recesses having end abutments, and separate means engageable in each of the recesses and engaging abutments thereof for normally holding the shifter rod in neutral position and for retarding the movement of the shifter rod from neutral position in either direction, one of said members riding over the abutment which it normally engages while the other member remains in its recess.

3. A transmission mechanism including a shiftable power transmitting element and a shifter rod for operating the same, a member movable relative to the shifter rod, link connections between the movable member and shifter rod for imparting movement to the rod, and means cooperating with the link connections for increasing the speed of the rod relative to the movable member at a predetermined point.

4. A transmission mechanism including a shiftable power transmitting element and a shifter rod for operating the same, a member movable relative to the shifter rod, link connections between the movable member and shifter rod for imparting movement to the rod, and means engageable with the link connection at a predetermined point, to cause a decrease in leverage in order to increase the speed of movement of the shifter rod relative to that of the movable member.

5. A transmission mechanism including a shiftable power transmitting element, a shiftable member for operating the power transmitting element, means for controlling the speed of the power transmitting element, and means for initially operating the speed control means, said means including self-adjusting instrumentalities adapted to build up force to subsequently operate the shiftable member.

6. A transmission mechanism including a shiftable power transmitting element, changeable leverage means for controlling the speed of the power transmitting element, means for operating the speed control means, and means for changing the leverage of the operating means at a predetermined point to operate the shiftable power transmitting element.

7. A transmission mechanism including intermeshable power transmitting elements, one of which is shiftable relative to the other, a rod, a yoke slidable on the rod, means for synchronizing the speeds of the power transmitting elements before they are meshed, a rocker arm operable by the yoke, means engageable with the rocker arm for operating the synchronizing means, and common means for rocking the rocker arm to operate the synchronizing means and for shifting the shiftable power transmitting element.

8. A transmission mechanism including intermeshable power transmitting elements, one of which is shiftable relative to the other, means for synchronizing the speeds of the power transmitting elements before they are meshed, a rocker arm, means engageable with the rocker arm for operating the synchronizing means, and a slidable yoke for rocking the rocker arm to operate the synchronizing means and shift the shiftable power transmitting element.

9. A transmission mechanism including intermeshable power transmitting elements, one of which is shiftable relative to the other, means for synchronizing the speeds of the power transmitting elements before they are meshed, a shifter rod for shifting the shiftable power transmitting element, a yoke slidable relative to the shifter rod, means for sliding the yoke, and means connected to the yoke for operating the synchronizing means and for operating the shifter rod.

10. A transmission mechanism including intermeshable power transmitting elements, one of which is shiftable relative to the other, a rocker arm, means controlled by the rocker arm for synchronizing the speeds of the power transmitting element before they are meshed, a rod, a yoke slidable on the rod, means for sliding the yoke, and means connecting the yoke and rod for engaging the rocker arm to operate the synchronizing means and to operate the rod to shift the shiftable element.

11. A transmission mechanism including intermeshable power transmitting elements, one of which is shiftable relative to the other, a rocker arm, means controlled by the rocker arm for synchronizing the speeds of the power transmitting elements before they are meshed, a rod, a yoke slidable on the rod, means for sliding the yoke, and links connecting the yoke and rod for engaging the rocker arm to operate the synchronizing means and to operate the rod to shift the shiftable power transmitting element.

12. A transmission mechanism including intermeshable power transmitting elements one of which is shiftable into and out of engagement with the other, means for regulating the speed of the power transmitting elements prior to intermeshing them and operating means for causing operation of the speed regulating means and moving the shiftable element, said operating means including a manual control lever and means whereby a decrease of leverage as compared to that of the manual control lever is obtained to move the shiftable power transmitting element at a relatively more rapid rate after passing a given point.

13. In transmission mechanism the combination of a pair of interengageable toothed power transmitting elements and a pair of frictional synchronizing elements; control mechanism for effecting engagement and disengagement of said elements, said control mechanism including a shift lever, operative connections between said shift lever and said synchronizing elements operative to impart pressure to cause engagement of the latter during a portion of the movement of the lever in one direction and thereafter to release said pressure; and operative connections between said shift lever and said toothed power transmitting elements including means constructed and arranged to interpose a resistance to the continued movement of the shift lever additional to the normal resistance to relative engaging movement of said toothed power transmitting elements.

14. In transmission mechanism the combination of a pair of interengageable toothed power transmitting elements and a pair of frictional synchronizing elements; control mechanism for effecting engagement and disengagement of said elements, said control mechanism including a shift lever, operative connections between said shift lever and said frictional synchronizing elements operative to impart pressure to cause engagement of the latter during a portion of the movement of the shift lever in one direction and thereafter to release said pressure, and operative connections between said shift lever and said toothed power transmitting elements constructed and arranged during continuing movement of the shift lever to impart a lower pressure and higher speed to the toothed power transmitting elements than are imparted by said lever to the last named operative connections and to said frictional synchronizing elements, in response to a given force exerted on the power arm of the shift lever.

15. In transmission mechanism the combination of interengageable toothed power transmitting elements and frictional synchronizing elements; a shift lever; shifting devices operatively interposed between said shift lever and said toothed and synchronizing elements adapted to be moved by said lever, said shifting devices including mechanical advantage means constructed and arranged to translate a given force exerted by the shift lever on the shifting devices into a greater force exerted on the synchronizing elements and a lesser force exerted on the toothed elements to first effect engagement of said synchronizing elements and thereafter of the toothed elements.

16. In transmission mechanism the combination of a pair of intermeshable toothed power transmitting elements one of which is movable into and out of engagement with its companion; a pair of friction elements one of which is movable into frictional driving engagement with its companion, said friction elements having driving connection, respectively, with the respective toothed elements; means for effecting engagement of the friction elements to synchronize the speeds of the toothed elements and for thereafter effecting engagement of the toothed elements, said means comprising a shift lever, movable shifter mechanism operatively connected to said shift lever and to said movable friction and toothed elements, said shifter mechanism including a leverage changing device constructed and arranged to shift the movable toothed member with a lesser mechanical advantage than is applied to shift the shifter mechanism and the movable frictional synchronizing elements.

17. In transmission mechanism the combination of interengageable toothed power transmitting elements and frictional synchronizing elements; a housing therefor; a manually controllable shift lever; a movable shifting device interposed between said shift lever and the synchronizing elements whereby to effect frictional engagement of the latter, a movable shifting device for effecting engagement of the toothed elements, said movable shifting devices being capable of limited relative movement; yieldable means between the later named shifting device and the housing adapted to resist movement of said last named shifting device; and means rendered effective by driving frictional engagement of the synchronizing elements for causing the shifting device connected to the shift lever to be positively coupled to the shifting device connected to the toothed elements and thereby overcome the resistance of said yieldable means between said last named shifting device and the housing.

18. In transmission mechanism the combination of interengageable toothed power transmitting elements and interengageable frictional synchronizing elements; a housing therefor; a movable device engageable by the shift lever constructed and arranged to cause engagement of the frictional synchronizing elements in response to suitable movement of the shift lever; a movable device for effecting engagement of the toothed elements; a yieldable locking device arranged to releasably lock said last named movable device to the housing, said locking device being releasable in response to a predetermined force exerted by the movable device; and connecting means between said movable devices adapted to limit the amount of relative movement of said devices.

19. In transmission mechanism the combination of interengageable toothed elements and interengageable frictional synchronizing elements; a housing therefor; a manually controllable shift lever; a movable device engageable by the shift lever arranged to operate the frictional synchronizing elements; a device for effecting engagement of the toothed elements movable relative to and in the same general direction as said device for operating the synchronizing elements; a yieldable locking device arranged to releasably lock said last named movable device to the housing, said locking device being releasable in response to a predetermined force applied to the locking device, and connecting means between said movable devices adapted to limit the amount of relative movement thereof, said connecting means being constructed and arranged to resolve the force applied by the shift lever into two forces at right angles to each other, one acting to press the friction synchronizing elements into frictional driving engagement and the other tending to move the device for operating the synchronizing elements.

20. The combination in power transmission mechanism of toothed intermeshable power transmitting elements one of which is axially movable into and out of engagement with the other; synchronizing means comprising rotatable frictional devices one of which is axially movable into and out of frictional driving engagement with the other in order to synchronize the speeds of the toothed power transmitting elements prior to interengagement thereof, and an operating member movable transversely of the axis of said frictional synchronizing device for effecting engagement of the latter; manually controllable means for effecting the operation of the synchronizing elements and the toothed power transmitting elements comprising a manual shift lever, a slidable device adapted to be engaged by the shift lever, a slidable device connected to the axially movable power transmitting element, a toggle link connection between said slidable devices adapted to bear upon said operating member for the synchronizing devices, and a yieldable lock for resisting the movement of the slidable device connected to the axially movable power transmitting member, said lock being releasable in response to a predetermined force applied to the slidable device, the movement of which is resisted by it.

21. In power transmission mechanism, the combination with intermeshable toothed power transmitting elements and means for regulating the speed thereof prior to intermeshing them, a shifter rod, a yoke slidable relative to the shifter rod, a manual control device for operating the yoke, and links connecting the yoke and shifter rod for operating the speed regulating means and shifting the rod.

22. In power transmission mechanism, the combination with intermeshable toothed power transmitting elements and means for regulating the speed thereof prior to intermeshing them, a shifter rod for shifting the toothed elements, a member carried by the shifter rod and slidable relative thereto, a manually controllable device arranged to engage and operate said member, and means associated with said slidable member and operable thereby for operating the speed regulating means and thereafter the shifter rod.

23. In power transmission mechanism, the combination with intermeshable toothed power transmitting elements and means for regulating the speed thereof prior to intermeshing them, a shifter rod for shifting the toothed power elements, a member carried by the shifter rod and slidable relative thereto, a manually controllable device arranged to engage and operate said member, and pivotally connected links associated with said member for operating the shifter rod.

24. In power transmission mechanism, the combination with intermeshable toothed power transmitting elements and means for regulating the speed thereof prior to intermeshing them, a shifter rod for shifting the power elements, a member carried by the shifter rod and slidable relative thereto, and links pivotally connected to the shifter rod and member adapted to cause operation of the speed regulating means and shifter rod when said member is moved.

25. In power transmission mechanism, the combination with interengagable toothed power elements and means for regulating the speed thereof prior to intermeshing them; a housing; two slidable shifter elements mounted in the housing and capable of moving relative to each other; a manually controllable device arranged to engage and move one of said elements; means rendered effective by a preliminary movement of the shifter element engaged by the manual device for operating the speed regulating means; a fork secured to the other shifter element for effecting engagement of the toothed element; means for releasably locking said other shifter element against longitudinal movement until said speed regulating means has been operated; a lost motion connection between said slidable shifter elements comprising a lever pivoted to the element carrying the shifter fork, flexible linkage between the shifter element engaged by the manually controlled device and a point between the pivoted end of said lever and its free end, and a stop fixed with respect to the housing arranged to engage the free end of the lever upon the release of the releasable locking means.

In testimony whereof I hereunto affix my signature.

EARL A. THOMPSON.